United States Patent

[11] 3,624,165

| [72] | Inventors | John S. Dehn;<br>Johnny L. Slate, both of Texas City, Tex. |
|---|---|---|
| [21] | Appl. No. | 819,489 |
| [22] | Filed | Apr. 25, 1969 |
| [45] | Patented | Nov. 30, 1971 |
| [73] | Assignee | Monsanto Company<br>St. Louis, Mo. |

[54] PURIFICATION PROCESS
5 Claims, No Drawings

[52] U.S. Cl. .................................................. 260/643 F,
260/450
[51] Int. Cl. ...................................................... C07c 29/24
[50] Field of Search ........................................... 260/450,
643 F, 643 L

[56] References Cited
UNITED STATES PATENTS

| 2,713,075 | 7/1955 | Doeringer et al. ............ | 260/643 F |
| 3,373,180 | 3/1968 | Glass et al. .................... | 260/450 |
| 3,433,841 | 3/1969 | Dehn et al. ................... | 260/450 X |

Primary Examiner—Howard T. Mars
Attorneys—C. James Bushman, Elizabeth F. Sporar and M. N. Cheairs ABSTRACT: A process for removing iron carbonyls from an alkanol stream, said alkanol having one to 15 carbon atoms, comprising contacting said stream with a metal oxide and separating the alkanol from the metal oxide.

PURIFICATION PROCESS

BACKGROUND OF THE INVENTION

The present invention relates to a process for the purification of fluids. More particularly, the present invention is directed to the removal of metal carbonyls, particularly iron carbonyls, from said fluids.

Many different products are produced by the catalytic reaction of carbon oxides with hydrogen. Mixtures of hydrocarbons, methanol and higher alcohols, ketones and aldehydes are all produced, for example, in the well known Fischer-Tropsch synthesis which involves the reaction of carbon monoxide and hydrogen or carbon monoxide, carbon dioxide and hydrogen over a suitable catalyst. In the so-called Oxo process, a mixture of carbon monoxide, hydrogen and olefins is reacted in the presence of a catalyst to produce a product comprising aldehydes, alcohols and hydrocarbons. In these processes as well as others which employ mixtures of hydrogen and oxides of carbon as reactants, the products are frequently contaminated with metal carbonyls such as iron and nickel carbonyl. Most commonly, the metal carbonyls found are the iron carbonyls. The iron carbonyl impurities which include iron tetracarbonyl, iron nonacarbonyl and, most frequently, iron pentacarbonyl are formed as a result of the reaction of the carbon monoxide with the iron present in many of the catalysts employed or directly with the reactor itself. The presence of metal carbonyls such as iron carbonyls in products containing them has a deleterious effect on subsequent reactions utilizing such products and, consequently, their removal is not only desirable but in many cases expedient.

SUMMARY OF THE INVENTION

It is, therefore, an object of the present invention to provide a process for the purification of fluids containing metal carbonyls.

It is also an object of the present invention to provide a process for the purification of fluids containing iron carbonyls.

Another object of the present invention is to provide a process for the removal of metal carbonyls, particularly iron carbonyls from the products obtained by reacting a mixture comprising hydrogen and carbon oxides.

A still further object of the present invention is to provide a process for the removal of metal carbonyls, particularly iron carbonyls from alcohols, particularly methanol.

These and other objects, which will become apparent from what follows hereinafter, can be accomplished by a purification process comprising: contacting a fluid containing metal carbonyls as impurities with a compound of a metal having a sufficiently high oxidation potential to oxidize the metal in said metal carbonyls to a higher oxidations state, said compound being substantially insoluble in said fluid, and; separating said fluid from said compound.

While the process herein is applicable to the removal of any oxidizable metal carbonyl such as, for example, nickel carbonyl from a fluid containing same, for purposes of simplicity, the description and examples presented herein are directed primarily to iron carbonyls. It is obvious, however, that what is said concerning iron carbonyls is equally applicable to like oxidizable metal carbonyls. When the metal carbonyls present in the fluid product being purified are contacted with the metal compound, as defined above, a redox reaction occurs wherein the metal compound is reduced and the metal carbonyl is oxidized, a typical overall reaction being exemplified by the following equation involving iron carbonyl:

where M = a metal as defined above
X = an anion, and
N = an integer from 4 to 5.

DESCRIPTION OF THE PREFERRED EMBODIMENTS

The metal compounds useful in the practice of the present invention can be any compound which is substantially insoluble in the fluid being purified and in which the metal therein possesses a sufficiently high oxidation potential to effect an oxidation of the zero valent metal present in the metal carbonyls to a higher oxidation state, as for example free iron to ferrous iron. Preferred, however, by virtue of availability and economy, are compounds of metals such as copper, iron, mercury, palladium, tellurium, cerium, bismuth, cobalt, nickel, silver, thallium, gold, platinum and lead. Especially preferred are compounds of iron. It is also generally preferred that the metal compound be one in which the metal is in its highest oxidation state.

Numerous compounds of the above described metals can be employed. Suitable compounds include the oxides, aluminates, silicates, selenates, carbonates, etc., of the above metals.

The physical form of the particular metal compound used is not critical and can be in the form of powder, granules, lumps, pellets, etc. It has also been found that the surface area of the metal compound can vary over extremely wide limits. For example, metal compounds having surface areas ranging from 1 up to 100 m.$^2$/g. have been found to be effective in the process of the present invention.

When the compounds used are the metal oxides, which are the preferred compounds, it is desirable, prior to use, to heat the oxide in the presence of an oxygen-containing gas at a temperature of from 150° to 200° C. for a period ranging from 0.5 to 1 hours prior to use. Such pretreatment, although not necessary, insures that no reduced form of the oxide is present and makes for more efficient removal of the metal carbonyls from the fluid being treated. Furthermore, when metal oxides are used for the treatment of metal carbonyl containing streams, they can be regenerated by the above pretreatment process although the time of heating may have to be prolonged depending on the prior amount of use of the metal oxide.

A desirable method of preparing the preferred metal oxides is to precipitate the metal as its basic carbonate or hydroxide from an aqueous solution of the particular metal salt and then convert the carbonate or hydroxide to the corresponding oxide. In this method, a solution of a water-soluble salt, such as a nitrate of the particular metal is prepared. The metal is next precipitated as its basic carbonate or hydroxide using well known techniques. The precipitated carbonate or hydroxide is separated, washed, dried, and then pelletized by conventional methods. The pellets are than calcined to convert the carbonate or hydroxide to the corresponding metal oxide. The pellets of the metal oxide thus prepared are extremely effective in removing metal carbonyls from various fluids.

The contacting contemplated by the process of the instant invention can be accomplished in any manner in which the fluid being purified is intimately admixed with the metal compound. For example, the fluid and compound may be slurried together or the fluid may be percolated through a bed of the metal compound. In both the slurrying and percolation techniques, the compounds may be used directly or the compound may be deposited on a support such as alumina, carbon, clays, silica or the like. In this latter technique, the compound is dissolved in a solvent, following which, the solution and support are mixed together and the solvent then removed, leaving the compound on the surface of the support. The thus coated support is then used rather than the pure metal compound.

The slurrying method is generally used when a batch-type operation is employed whereas the percolation method, which is preferred, is more adaptable to continuous commercial operation wherein a product stream is continuously passed through a column packed with the metal compound or support carrying such. Furthermore, the method involving percolation of the fluid through a column is desirable since no further separation of fluid from the metal compound is required. When the slurrying method is employed, the treated fluid must be separated by filtration, distillation, decantation or other like techniques.

The process of the present invention may be carried out over a broad range of temperatures, the lower limit being dictated by the kinetics of the reaction between the metal carbonyl and the metal compound, the reaction being favored by higher temperatures. In general, the process of the present invention can be carried out at temperatures between 0° and 120° C. with the range between 10° to 50° C. being particularly desirable, the latter range, of course, broadly conforming to ambient temperatures. The metal carbonyl-containing fluids may be treated by the process of the present invention in either the gaseous or liquid phase. Usually, however, the fluids treated are in the liquid phase. When the fluid being purified is an alcohol or mixtures of alcohols, treatment in the liquid phase is especially preferred.

Pressures ranging from atmospheric or lower up to several atmospheres, i.e., 15 atmospheres or higher, may be used in the practice of the present invention. Usually, a pressure at or near atmospheric is employed. Obviously, higher pressures may be resorted to if it is desired to keep the fluid being purified in the liquid phase. For example, in the purification of methanol at a temperature above its boiling point, in order to purify the methanol as a liquid, a pressure above atmospheric must be employed.

The time of contacting depends on the amount of metal carbonyls present, the particular metal compound employed, the efficiency or removal desired, etc. By using the percolation method, the time of contacting can be easily controlled by adjusting the height of the column or thickness of the bed of the metal compound or by varying the flow rates. The flow rates can vary over broad limits depending on the factors described above relating to contact time. Usually, however, a flow rate of from 0.05 to 4 gallons per cubic foot of the metal compound or support carrying such per minute is employed. In commercial use, a series of columns or beds may be employed, the outflow from one being cycled through a succeeding column until the desired degree of purification is attained.

Almost any fluid containing metal carbonyls may be purified by the practice of the present invention. More frequently, however, the fluid purified will be iron-carbonyl-containing streams, particularly those resulting from the reaction of a mixture comprising carbon monoxide and hydrogen wherein iron is present in the catalyst and/or the reactor system itself. The present invention is most useful in the removal of metal carbonyls and particularly iron pentacarbonyl from fluids comprised of an organic compound having at least one hydroxyl group, particularly monohydroxy alcohols having from one–15 carbon atoms. Examples of such alcohols include for example the alkanols, ethanol, isopropanol, n-butanol, the octanols, the decanols, 1-dodecanol, tridecanol, etc. In its preferred embodiment, the process of the present invention is used for the removal of iron carbonyls from methanol produced by the catalyst reaction of carbon monoxide and hydrogen. It is to be emphasized, however, that the present invention is not limited to purifying alcohols produced by the reaction of mixtures comprising hydrogen and carbon monoxide.

The following example are given to illustrate but not to limit the present invention. In all cases, the methanol used was prepared by reacting carbon monoxide and hydrogen at a temperature of around 375° C. in the presence of a catalyst.

EXAMPLE 1

A bed of ferric oxide pellets was prepared by filling a 1 inch diameter column to a depth of 24 inches with the pellets. To prepare the pellets, an aqueous solution of water soluble ferric compound was made. Ferric hydroxide was precipitated from the solution. The ferric hydroxide precipitate was washed, extruded and chopped into pellets and calcined at around 900° C. for 2 hours to convert the ferric hydroxide to ferric oxide. The pellets, of generally cylindrical shape, varied from about one-eight to one-fourth inch in length with a diameter of approximately one-eighth inch and had a surface area of around 2.5m$^2$/gm. Methanol which contained about 0.73 parts per billion iron carbonyl was passed through the bed at a rate of 0.2 gallons per cubic foot of the ferric oxide per minute and at a temperature of around 25° C. The effluent from the bed contained less then 0.1 parts per billion iron carbonyl.

EXAMPLE 2

A ferric oxide bed was prepared in the same manner as that in example 1. Methanol containing 254 parts per billion iron pentacarbonyl was passed through the bed at a rate of about 0.2 gallons per cubic foot of the ferric oxide pellets per minute and at a temperature of around 25° C. The effluent from the bed contained less than 0.1 parts per billion iron pentacarbonyl.

EXAMPLE 3

A ferric oxide bed prepared as per example 1 was used to purify a methanol sample containing 254 parts per billion iron pentacarbonyl. The methanol solution was passed through the bed at a rate of 0.1 gallons per cubic foot of the ferric oxide per minute and at a temperature of around 25° C. The effluent from the bed contained less than 0.1 parts per billion iron pentacarbonyl.

EXAMPLE 4

A bed of granulated clay of 8–12 mesh having thereon 30 percent by weight copper as copper oxide and a surface area of greater than 75 m.$^2$/gm was prepared by filling a 1 inch diameter column to a height of 24 inches. Methanol containing 38 parts per billion of iron carbonyl was passed through the bed at a temperature of around 25° C. and a flow rate of around 0.2 gallons per cubic foot of the cupric oxide coated clay per minute. The effluent from the bed contained 4 parts per billion iron pentacarbonyl.

EXAMPLE 5

A cupric oxide bed was prepared as per the procedure of example 4. Methanol solution containing 0.8 parts per billion iron carbonyl was passed through the bed at a rate of 0.4 gallons per cubic foot of the cupric oxide coated clay per minute and at a temperature of 25° C. The effluent from the bed contained less then 0.1 parts per billion iron pentacarbonyl.

EXAMPLE 6

A cupric oxide bed was prepared according to the procedure of example 4. A methanol solution containing 37 parts per billion iron pentacarbonyl was passed through the bed at a rate of 0.8 gallons per cubic foot of the cupric oxide coated clay per minute and at a temperature of 25° C. The effluent from the bed contained 25 parts per billion iron pentacarbonyl.

As can be seen from the preceding examples, the process of the instant invention is extremely effective in removing iron carbonyl from alcohol streams. As will also be noted, even at high flow rates through the bed, there is an appreciable reduction in the iron pentacarbonyl content of the methanol being treated.

What is claimed is:

1. A process for the removal of iron carbonyl impurities from an alkanol stream containing such impurities, said alkanol having one to 15 carbon atoms, which process comprises contacting said stream at a temperature of from about 0° C. to about 120° C. with ferric oxide, and separating said alkanol from the ferric oxide.

2. The process of claim 1 wherein said alkanol is in the liquid phase.

3. The process of claim 1 wherein said alkanol is methanol.

4. The process of claim 1 wherein said iron carbonyl impurities comprises iron pentacarbonyl.

5. The process of claim 1 wherein said contacting and separating are accomplished by passing said alkanol stream through a bed of said ferric oxide.

* * * * *